United States Patent
Bai et al.

(10) Patent No.: US 11,159,225 B2
(45) Date of Patent: Oct. 26, 2021

(54) CONTROL FOR MULTI-PANEL UE ACTIVATION/DEACTIVATION

(71) Applicant: QUALCOMM Incorporated, San Diego, CA (US)

(72) Inventors: Tianyang Bai, Bridgewater, NJ (US); Yan Zhou, San Diego, CA (US); Jung Ho Ryu, Fort Lee, NJ (US); Kiran Venugopal, Raritan, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/863,353

(22) Filed: Apr. 30, 2020

(65) Prior Publication Data

US 2020/0350976 A1     Nov. 5, 2020

Related U.S. Application Data

(60) Provisional application No. 62/841,640, filed on May 1, 2019.

(51) Int. Cl.
   *H04B 7/08* (2006.01)
   *H04B 7/06* (2006.01)
   *H01Q 1/24* (2006.01)

(52) U.S. Cl.
   CPC ......... *H04B 7/0874* (2013.01); *H04B 7/0617* (2013.01); *H04B 7/0626* (2013.01); *H04B 7/0628* (2013.01); *H01Q 1/243* (2013.01)

(58) Field of Classification Search
   CPC .. H04B 7/0874; H04B 7/0617; H04B 7/0626; H04B 7/0628; H01Q 1/243
   See application file for complete search history.

(56) References Cited

U.S. PATENT DOCUMENTS

| 2010/0279625 | A1* | 11/2010 | Ko ..................... | H04B 7/0691 |
| | | | | 455/68 |
| 2018/0262313 | A1* | 9/2018 | Nam ..................... | H04L 5/005 |
| 2020/0314763 | A1* | 10/2020 | Cheng .................. | H04L 5/0053 |

FOREIGN PATENT DOCUMENTS

WO     WO-2019032997 A1 *     2/2019     ........... H04L 5/0032

OTHER PUBLICATIONS

Asia Pacific Telecom: "Enhancements on UL Multi-Beam Operation", 3GPP Draft, R1-1902408, 3GPP TSG-RAN WG1 #96, Enhancements on UL Multi-Beam Operation, 3rd Generation Partnership Project (3GPP), Mobile Competence Centre, vol. RAN WG1, No. Athens, Greece, 20190225 -20190301, Feb. 15, 2019 , XP051600104, 4 Pages, Retrieved from the Internet: URL: http://www.3gpp.org/ftp/tsg%5Fran/WG1%5FRL1/TSGR1%5F96/Docs/R1%2D1902408%2Ezip [retrieved on Feb. 15, 2019] Section 2.

(Continued)

*Primary Examiner* — Jaison Joseph
(74) *Attorney, Agent, or Firm* — Robert A. Reid; Arent Fox LLP

(57) ABSTRACT

Control for multi-panel user equipment (MPUE) activation may be performed by both the MPUE and a base station. The MPUE may have at least a first panel and a second panel. The MPUE may send to the base station, a request to change an activation status of at least one panel of the MPUE. The base station may transmit a response indicating whether the request has been approved. The MPUE may change the activation status of the panel according to the response. Conversely, the MPUE may receive a command from the base station to change an activation status of at least one panel of the MPUE. The MPUE may determine whether to follow the command or override the command. The MPUE may transmit a response indicating whether the MPUEUE has followed the command or overridden the command.

30 Claims, 13 Drawing Sheets

(56) References Cited

OTHER PUBLICATIONS

International Search Report and Written Opinion—PCT/US2020/031153—ISA/EPO—dated Aug. 17, 2020.
Samsung: "On UE Adaptation Schemes", 3GPP Draft, R1-1902318, 3GPP TSG RAN WG1 RAN1 #96, On UE Adaptation Schemes, 3rd Generation Partnership Project (3GPP), Mobile Competence Centre, 650, Route Des Lucioles, F-06921, Sophia-Antipolis Cedex, France, vol. RAN WG1, No. Athens, Greece, 20190325-20190301, Feb. 15, 2019 (Feb. 15, 2019), XP051600012, 15 Pages, Retrieved from the Internet: URL: http://www.3gpp.org/ftp/tsg%5Fran/WG1%5FRL1/TSGR1%5F96/Docs/R1%2D1902318%2Ezip [retrieved on Feb. 15, 2019] Section 2.8.

* cited by examiner

CONTROL FOR MULTI-PANEL UE ACTIVATION/DEACTIVATION

CLAIM OF PRIORITY UNDER 35 U.S.C. § 119

This application claims priority to U.S. Provisional Application No. 62/841,640 titled "CONTROL FOR MULTI-PANEL UE ACTIVATION/DEACTIVATION," filed May 1, 2019, which is assigned to the assignee hereof, and incorporated herein by reference in its entirety.

BACKGROUND

Technical Field

The present disclosure relates generally to communication systems, and more particularly, to user equipment (UE) having multiple panels.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a first method, a non-transitory computer-readable medium storing executable instructions to perform the first method, and an apparatus (e.g., a base station) configured to execute the first method are provided. The first method may include, at a base station, receiving from a multi-panel UE (MPUE), a request to change an activation status of at least one panel of the MPUE. The first method may include determining whether to grant the request based, at least in part, on: an event triggering the request, a channel measurement, a capability of the UE, a predefined rule, or a combination thereof. The first method may include transmitting a response to the MPUE indicating the determination. The apparatus may include a memory storing computer-executable instructions and at least one processor coupled with the memory and configured to execute the instructions to perform the first method. Also, an apparatus may include means for performing the first method.

In another aspect, a second method, non-transitory computer-readable medium storing executable instructions to perform the second method, and an apparatus (e.g., a base station) configured to execute the second method are provided. The second method may include, at a base station, determining to change an activation status of at least one panel of a MPUE. The second method may include sending, to the MPUE, a command to change the activation status of the at least one panel. The second method may include receiving, from the MPUE, a response indicating whether the MPUE has followed or overridden the command. The apparatus may include a memory storing computer-executable instructions and at least one processor coupled with the memory and configured to execute the instructions to perform the second method. Also, an apparatus may include means for performing the second method.

In another aspect, a third method, non-transitory computer-readable medium storing executable instructions to perform the third method, and an apparatus (e.g., a MPUE) configured to execute the third method are provided. The third method may include, at the MPUE, sending, to a base station, a request to change an activation status of at least one panel of the MPUE. The third method may include receiving, from the base station, a response indicating whether the request has been approved. An event triggering the request may associated with a priority, and the MPUE may expect the request to be approved when the priority satisfies a threshold. The third method may include changing the activation status of the panel according to the response. The apparatus may include a memory storing computer-executable instructions and at least one processor coupled with the memory and configured to execute the instructions to perform the third method. Also, an apparatus may include means for performing the third method.

In another aspect, a fourth method, non-transitory computer-readable medium storing executable instructions to perform the fourth method, and an apparatus (e.g., a MPUE) configured to execute the fourth method are provided. The fourth method may include, at the MPUE, receiving, from a base station, a command to change an activation status of at least one panel of the MPUE. The fourth method may include determining whether to follow the request or override the command. The fourth method may include transmitting a response indicating whether the MPUE has followed the request or overridden the request. The apparatus may include a memory storing computer-executable instructions and at least one processor coupled with the memory and configured to execute the instructions to perform the fourth method. Also, an apparatus may include means for performing the fourth method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
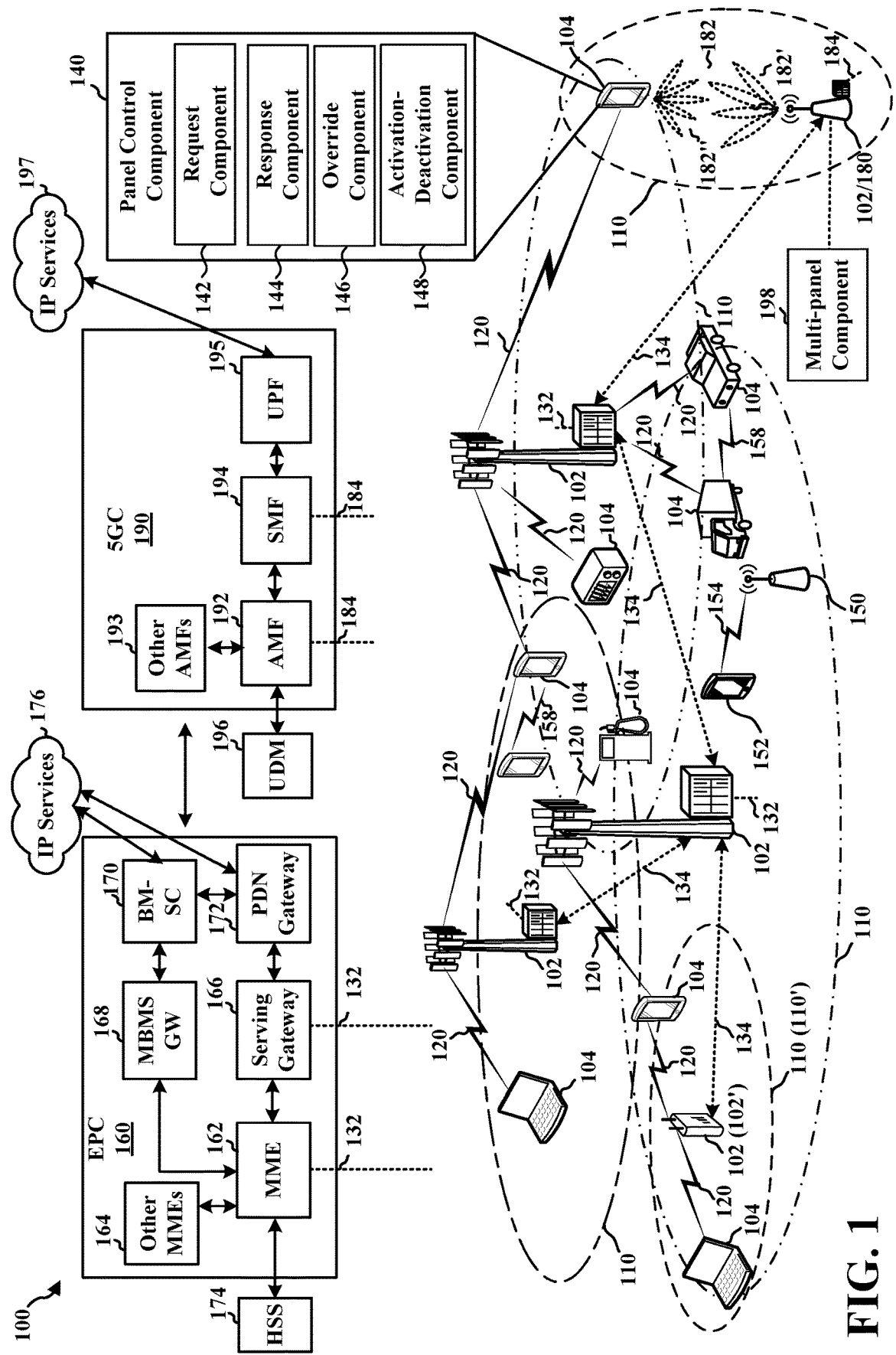
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A multi-panel UE (MPUE) may be a UE that includes multiple panels. An example of an MPUE may include a folding device that includes physical panels that fold with respect to each other. From a wireless communications perspective, however, the concept of an MPUE may be broader and may include any device with multiple antenna groups configured as panels. That is, an MPUE may not be limited to a particular form factor.

An MPUE may provide flexibility in selection of antennas for wireless communications. In particular, the concept of a panel may be used to activate or deactivate certain antennas in order to improve performance or save battery power. Generally, multiple panels may be activated at the same time, but a UE does not need to activate multiple panels. In an aspect, although multiple panels may be active, one panel may be selected for uplink transmission using a single beam. In other aspects, multiple beams may be transmitted from multiple panels.

In an aspect, a UE may control activation and/or deactivation of a panel. For example, the UE may activate or deactivate panels based on power consumption and/or maximum permissible exposure (MPE). Improvements in signaling between an MPUE and a base station may be desired to coordinate activation and deactivation of the panels and to select transmission properties corresponding to the active panels.

In an aspect, the present disclosure provides for prioritization when both the base station and the UE determine whether to activate or deactivate a panel. In a first implementation, the MPUE may send a request to the base station to change an activation status of one or more panels. The base station may evaluate the request, for example, based on a priority of the request and current conditions. The base station may transmit a response indicating whether the request was granted. In a second implementation, the base station may send a request to the MPUE to change the activation status of one or more panels. The MPUE may determine whether to follow the request or to override the request. For example, the MPUE may override the request based on a priority of the request and conditions detected by the MPUE. The first implementation and the second implementation may also be combined such that either the base station or the MPUE may make an initial request. In either implementation, once a decision is made, both the base station and the MPUE may refrain from additional requests for a period of time.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macrocells (high power cellular base station) and/or small cells (low power cellular base station). The macrocells include base stations. The small cells include femtocells, picocells, and microcells.

One or more of the UEs 104 may be an MPUE including at least a first panel and a second panel and a panel control component 140. The panel control component 140 may control activation and deactivation of the panels and perform by receiving and/or transmitting activation status change requests and determining whether to override received requests. For example, the panel control component 140 may include a request component 142, a response component 144, an override component 146, and/or an activation-deactivation component 148. In the first implementation, the request component 142 may send a request to change an activation status of at least one panel of the UE 104. The response component 144 may receive a response indicating whether the request has been approved. In the second implementation, the request component 142 may receive a request from a base station to change the activation status of the at least one panel. The override component 146 may determine whether to follow the request or to override the request. The activation-deactivation component 148 may change the activation status of the panel according to the response in the first implementation or the override decision in the second implementation.

Figure 13:
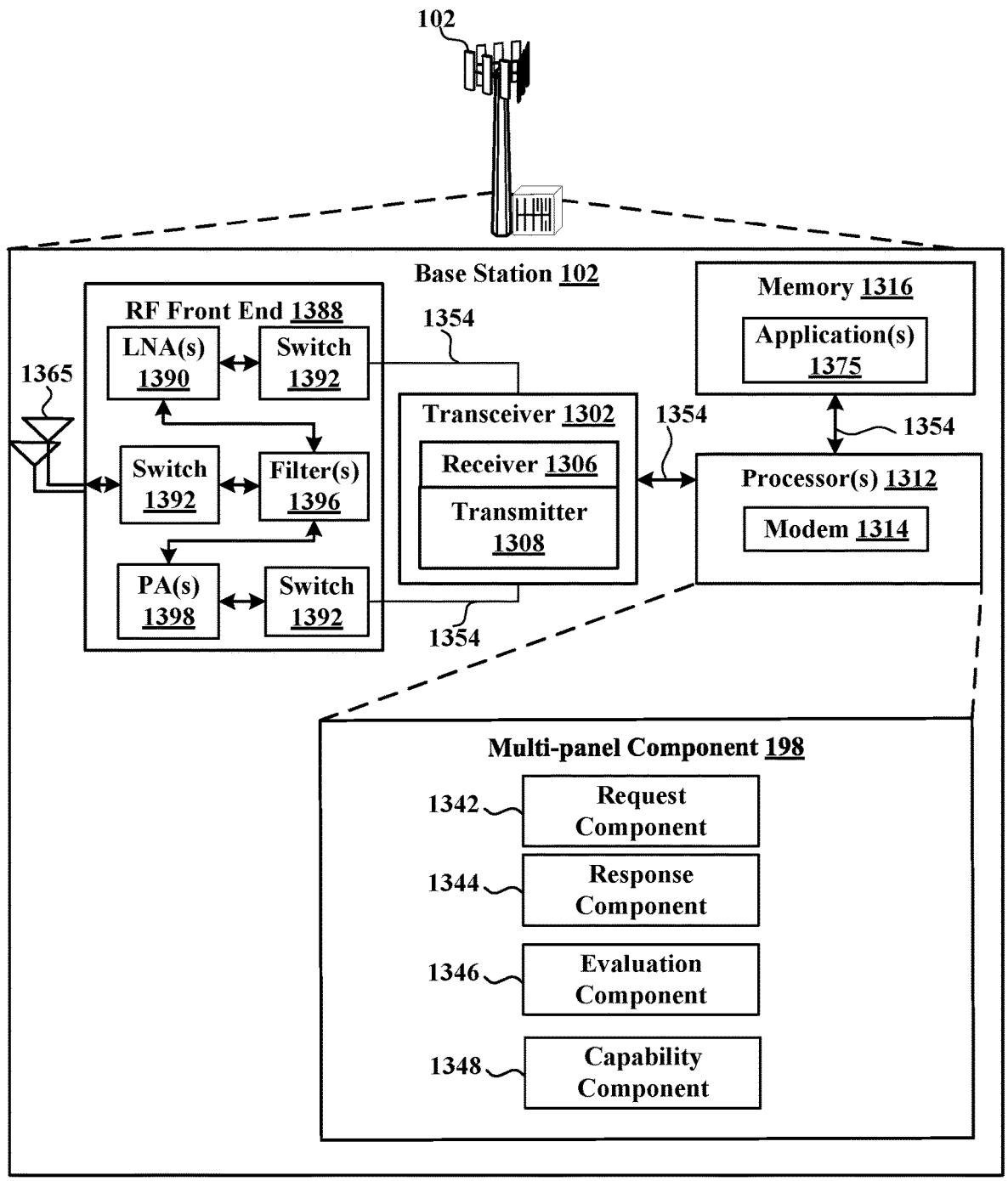
FIG. 13 is a schematic diagram of example components of the base station of FIG. 1.

A base station 102 in communication with the UE 104 may include a multi-panel component 198 that communicates with the panel control component 140 for activating and deactivating panels. For example, as illustrated in FIG. 13, the multi-panel component 198 may include a request component 1342, a response component 1344, an evaluation component 1346, and a capability component 1348. The request component 1342 may receive a request from the UE 104 to change an activation status of at least one panel of the UE 104. The response component 1344 may transmit a response indicating whether the requested change to the activation status has been granted. The evaluation component 1346 may determine whether to grant the requested change to the activation status. The capability component 1348 may receive a capability of the UE 104 indicating a capability of one or more of the panels. Further details of the multi-panel component 198 are described below.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
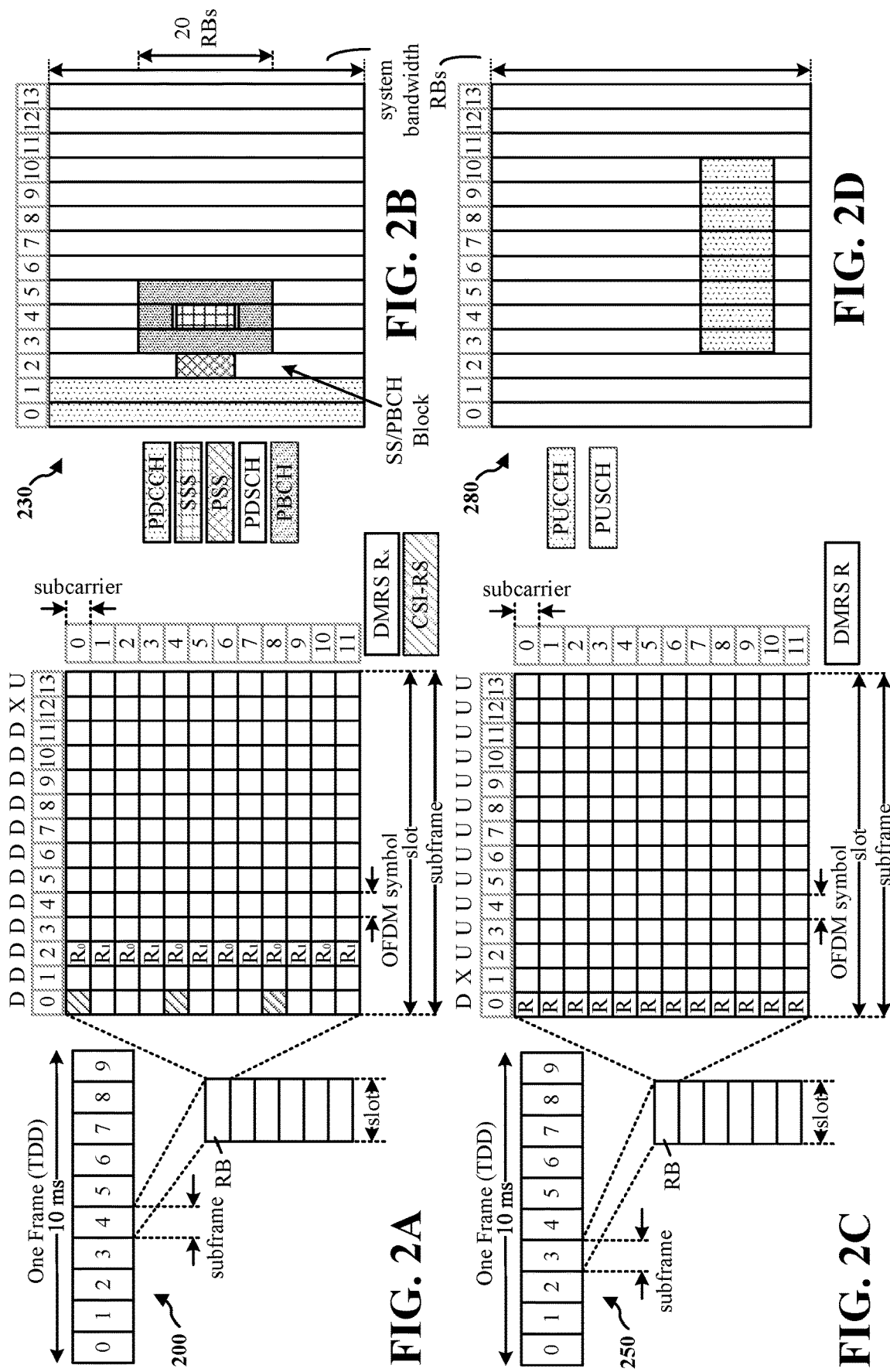
FIG. 2A is a diagram illustrating an example of a first 5G/NR frame.
FIG. 2B is a diagram illustrating an example of DL channels within a 5G/NR subframe.
FIG. 2C is a diagram illustrating an example of a second 5G/NR frame.
FIG. 2D is a diagram illustrating an example of a 5G/NR subframe.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
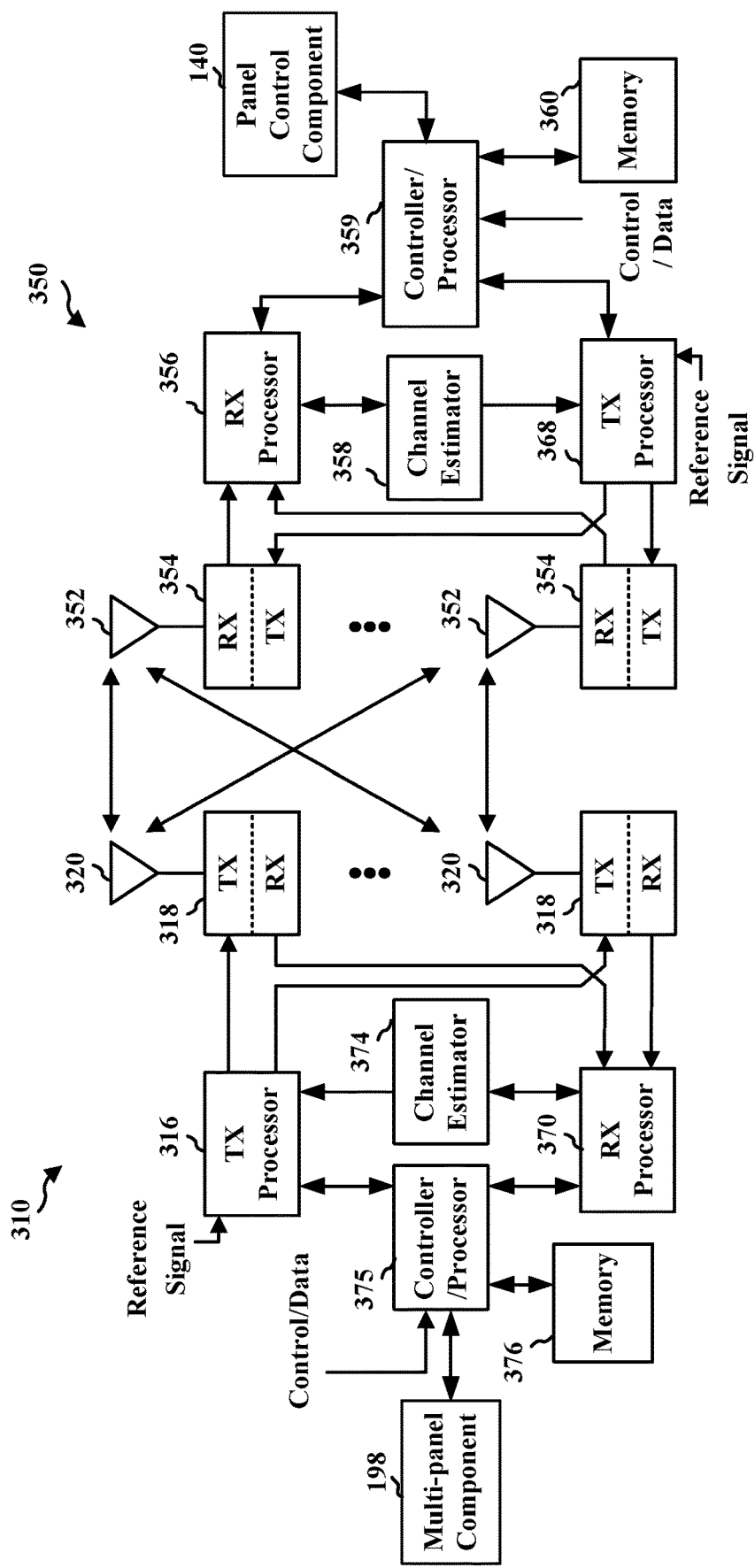
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the panel control component 140 of FIG. 1.

At least one of the TX processor 316, the RX processor 370, and the controller/processor 375 may be configured to perform aspects in connection with the multi-panel component 198 of FIG. 1.

Figure 4:
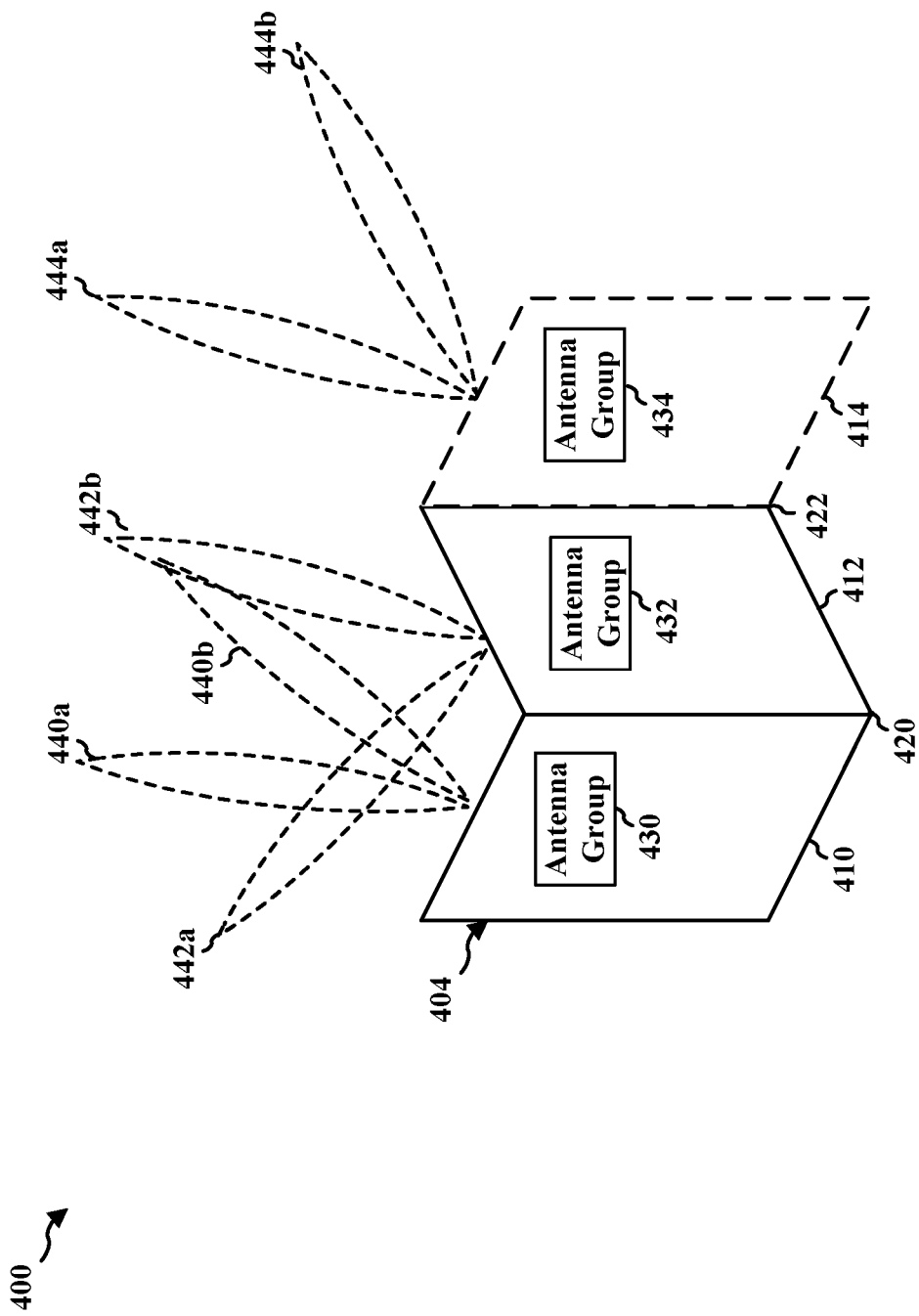
FIG. 4 is a conceptual diagram of a first example multi-panel UE.

Turning to FIG. 4 a conceptual diagram 400 includes an example multi-panel UE (MPUE) 404). The MPUE 404 may include multiple panels such as a first panel 410, a second panel 412, an optional third panel 414, and additional optional panels (not shown). Generally, a panel may be a component of a UE including an antenna group including one or more antennas. An antenna may include one or more antennas, antenna elements, and/or antenna arrays. Each panel may operate with a degree of independence. For example, each panel may be individually activated or deactivated. An activated panel may be used for transmission and/or reception. A deactivated panel may not be used for transmission and/or reception. For example, a deactivated panel may be in a sleep mode that saves power. In an aspect, a deactivated panel may be in a light sleep mode or a deep sleep mode. Each panel may be configured with a different panel identifier (panel ID). In an aspect, a panel may be associated with an antenna group. For example, the panel 410 may be associated with the antenna group 430, the panel 412 may be associated with the antenna group 432, and the panel 414 may be associated with the antenna group 434.

In an aspect, a panel may be a unit of an antenna group to control beams independently. For example, within a panel, one beam can be selected and used for UL transmission. For example, one of the beams 440a, 440b may be selected for panel 410. In an aspect, a UE may be limited to a single panel for UL transmission. In another aspect, multiple panels may be used for UL transmission and across different panels, multiple beams (each selected per panel) may be used for UL transmission. For example, one of the beams 442a, 442b may be selected for panel 412, and one of the beams 444a, 444b may be selected for panel 414. A limited number of beams is illustrated for simplicity, but it should be understood that a panel may select from a larger number of beams, for example, depending on a frequency range of the transmission.

In an aspect, a panel may be a unit of an antenna group to control transmission power for the antenna group. For example, all antennas or antenna elements within the antenna group may use the same transmission power.

In an aspect, a panel may be a unit of an antenna group having a common UL timing. For example, all antennas or antenna elements within the antenna group may be configured with the same timing advance.

In an aspect, the panels of the MPUE 404 may be based on a hardware structure of the MPUE 404. For example, the MPUE 404 may include a hinge 420 between the panel 410 and the panel 412 such that the panel 410 and panel 412 may be oriented at an angle with respect to each other. Similarly, a hinge 422 may be located between the panel 412 and the panel 414. In an aspect, the panels 410, 412, 414 may be physically reconfigured (e.g., by folding the MPUE 404 at a hinge 420, 422, to change the orientation of the panels. The direction of the beams associated with each panel may also change when the panels 410, 412, 414 are physically reconfigured.

Figure 5:
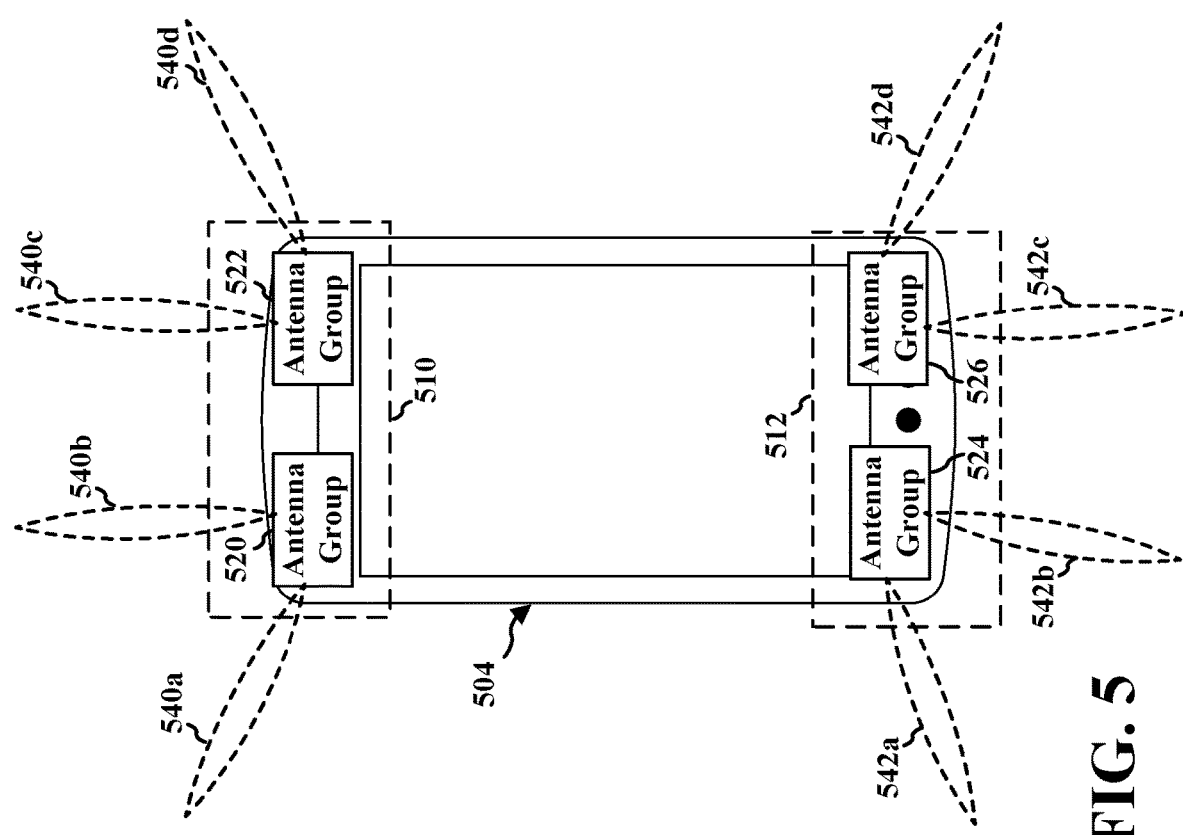
FIG. 5 is a conceptual diagram of a second example multi-panel UE.

In another aspect, the panels of the MPUE 404 may be dynamically defined, for example by selecting a subset of the total antennas or antenna elements as a panel. For example, FIG. 5 illustrates an example MPUE 504 that does not necessarily include hinges. The MPUE 504 may include multiple antenna groups 520, 522, 524, 526. The MPUE 504 may configure the antenna groups 520, 522, 524, 526 into multiple panels. For example, a panel 510 may include antenna groups 520 and 522 and the panel 512 may include antenna groups 524 and 526. When the panel 510 is active, one of the beams 540a, 540b, 540c, 540d may be selected for uplink transmission. When the panel 512 is active, one of the beams 542a, 542b, 542c, or 542d may be selected for uplink transmission. In an aspect, the MPUE 504 may dynamically configure panels including different combinations of the antenna groups 520, 522, 524, 526.

Figure 6:
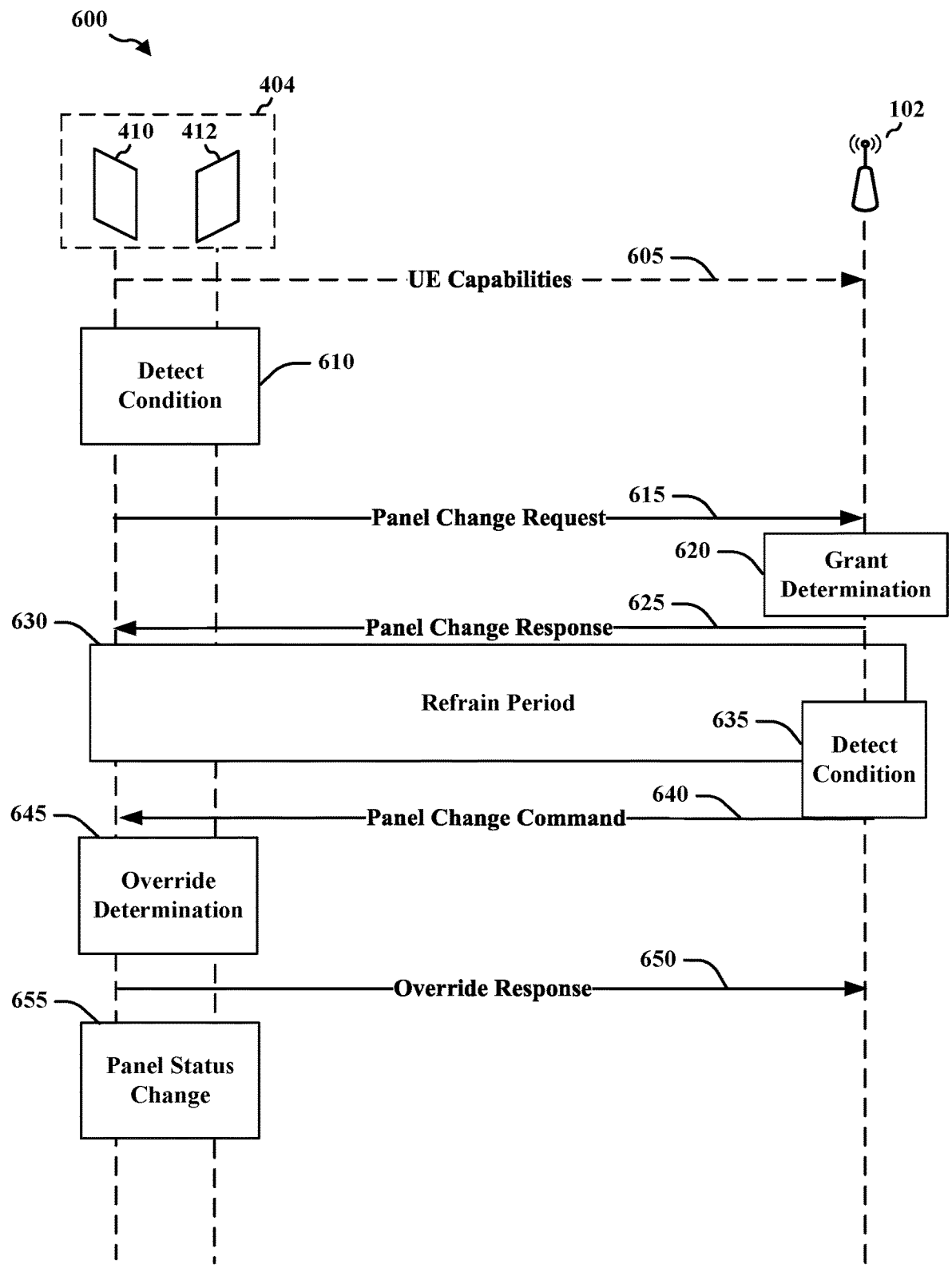
FIG. 6 is a message diagram showing example messages for activating and deactivating one or more panels of a multi-panel UE.

Turning to FIG. 6, an example message diagram 600 includes signaling messages that may be used to activate and/or deactivate one or more panels of an example MPUE 404.

The MPUE 404 may transmit UE capabilities 605, which may indicate that the MPUE 404 includes multiple panels. The UE capabilities 605 may be carried in an RRC configuration message. The UE capabilities 605 may indicate, for example, a number of panels, or a number of panels that may be concurrently activated.

The MPUE 404 may perform a detect condition process 610 that triggers a panel change request 615. For example, the MPUE 404 may detect a condition based on one or more of: a maximum permissible exposure (MPE) limit, power saving, a panel reconfiguration, a UE capability, a downlink measurement, or a predefined rule. For example, an MPE limit may reduce the transmission power available to a panel, so the MPUE 404 may determine to deactivate the panel. A power saving may include any condition detected by the MPUE where power may be saved by switching or deactivating a panel. A battery state or power level may be a factor affecting power saving. A panel reconfiguration may refer to a physical reconfiguration of the MPUE 404. For example, folding the panels into an overlapping configuration may result in redundant or interfering beams, so the MPUE 404 may determine to deactivate a panel. Conversely, unfolding the panels 410, 412 may provide an opportunity for a new beam or increased diversity, so the MPUE 404 may determine to activate a panel. The UE capability may indicate whether a potential activation status change is allowed. For example, the UE capability may configure the MPUE 404 with a maximum number of active panels even if the MPUE 404 includes a greater number of panels. A downlink measurement of signal quality and/or beam quality may be used to determine whether a change in panel activation status is likely to be beneficial. For example, the MPUE 404 may compare one or more measured qualities with each other, with a threshold, or with a previously measured quality of another panel to determine whether activating or deactivating a panel is likely to improve the quality. A predefined rule may be used by the MPUE 404 to determine the triggering event. For example, a predefined rule may only permit MPUE 404 to change activation status of a panel when the measured channel quality satisfies a predefined rule. For example, the predefined rule may allow MPUE 404 to activate a new panel, and deactivate an activated panel, when the measured receive signal strength of the new panel is 10 dB better than that of the activated panel for a predefined time period. A predefined rule may also disallow UE to make any determination of changing the panel status for a certain time period, e.g., a predefined time from sending a previous request of changing panel activation status.

In an aspect, a priority may be associated with one or more conditions detected by the MPUE 404. For example, in one implementation, a set of mandatory conditions may be defined, for example, in a standard or regulation. A mandatory condition may be a condition where the MPUE 404 and the base station 102 approve of a change of activation status based on detection of the condition. An event detected based on a mandatory condition may be referred to as a mandatory event. Other conditions may be optional and the MPUE 404 and/or the base station 102 may decline or override a request based on an optional condition, for example, based on a different condition detected at the other node. In another aspect, a priority rank may be assigned to each detected condition. For example, a standard or regulation may define priority ranks for specific conditions or events. As another example, the MPUE 404 may determine a priority rank based on one or more factors used to determine the condition. Accordingly, a priority rank may be a relative importance of the change in panel configuration to the MPUE 404.

The MPUE 404 may transmit a panel change request 615. A panel change request 615 may include a request by the MPUE 404 to activate one or more panels, to deactivate one or more panels, or to perform a combination of activation and deactivation, based on different conditions. The panel change request 615 may indicate, for example, one or more panel IDs for which the activation status of the panel is to be changed (e.g., activated or deactivated). The panel change request 615 may optionally include a direction of the change (e.g., activation or deactivation) for each panel ID. In an aspect, the panel change request 615 may include an indication of a condition or event triggering the panel change request 615, or indicate a priority of the panel change request 615.

The base station 102 may perform a grant determination 620 to determine whether to grant the panel change request 615. In an aspect, the grant determination 620 may be based on one or more of a priority of the panel change request 615 and a priority of a condition detected at the base station 102. The condition detected at the base station 102 may be based on a channel measurement, a capability of the UE, or a predefined rule. For example, the base station 102 may determine whether a panel change request 615 is associated with a mandatory condition based on an indicated priority, and automatically grant a request based on a mandatory condition. As another example, where a condition detected at the base station 102 conflicts with the panel change request 615, the base station 102 may determine whether to grant the request based on the relative priority of the panel change request 615 and the detected condition.

The base station 102 may transmit a panel change response 625 indicating whether the panel change request 615 has been granted. In an aspect, the MPUE 404 may abide by decisions made by the base station 102 in response to requests. That is, when the MPUE 404 has made a request, but the base station 102 does not grant the request, the MPUE 404 may be unable to override the decision.

In an aspect, the MPUE 404 and the base station 102 may follow a refrain period 630 following the panel change response 625. The refrain period 630 may be a period of time during which one or both of the MPUE 404 and the base station 102 refrain from transmitting panel change requests or commands. For example, even if the base station 102 detects a condition during the refrain period 630, the base station 102 may wait until after the refrain period 630 to initiate a panel change command 640. The refrain period 630 may reduce signaling overhead regarding panel activation and deactivation. The refrain period 630 may prevent frequent changes to the panel activation status, for example, due to conflicting conditions of similar priority levels. The refrain period 630 may be measured from a receipt of the panel change response 625. For example, the base station 102 may start the refrain period 630 when the MPUE 404 acknowledges a packet including the panel change response 625.

In an aspect, the base station 102 may initiate a panel status change. A panel status change may include the base station 102 requesting or commanding the MPUE 404 to activate one or more panels, to deactivate one or more panels, or to perform a combination of activation and deactivation, based on different conditions. For example, the base station may perform a detect condition process 635. For example, the base station 102 may measure the channel quality and/or beam quality of UL transmissions from the MPUE 404. In particular, in the absence of beam correspondence between UL and DL, the MPUE 404 may be unable to determine the best beam or panel for UL transmission, so such conditions may be best detected by the base station 102.

In an aspect, a priority may be associated with one or more conditions detected by the base station 102. For example, the priority may be based on one or more of: a channel measurement, a capability of the UE, or a predefined rule. As with the priority of conditions detected by the MPUE 404, in one implementation, a set of mandatory conditions detectable by the base station 102 may be defined, for example, in a standard or regulation. In another aspect, a priority rank may be assigned to each detected condition. For example, a standard or regulation may define priority ranks for specific conditions or events. As another example, the base station 102 may determine a priority rank based on one or more factors used to determine the condition. Accordingly, a priority rank may be a relative importance of the change in panel configuration to the base station 102.

The base station 102 may transmit a panel change command 640. The panel change command 640 may indicate, for example, one or more panel IDs to be changed. The panel change command 640 may optionally include a direction of the change (e.g., activation or deactivation) for each panel ID. In an aspect, the panel change command 640 may include an indication of a condition triggering the panel change command 640, or indicate a priority of the panel change command 640.

The MPUE 404 may perform an override determination 645 regarding the panel change command 640. The override determination 645 may be based on a priority of the panel change command 640 and a priority of a condition at the MPUE 404. For example, the MPUE 404 may determine to override the panel change command 640 when the condition is inconsistent with the panel change command 640 and the priority of the condition is greater than the priority of the panel change command 640. In contrast, the MPUE 404 may determine to follow the panel change command 640 when the panel change command 640 is consistent with the condition or the priority of the panel change command 640 is greater than the priority of the condition.

The MPUE 404 may transmit an override response 650. The override response 650 may indicate whether the panel change command 640 was followed or overridden. The override response 650 may allow the base station 102 to track the activation status of the panels 410, 412. For example, the base station 102 may perform scheduling and measurements based on the activation status of the panels 410, 412.

The MPUE 404 may perform a panel status change 655. The panel status change 655 may be in response to the panel change response 625 or the override determination 645. The panel status change 655 may include an activation process to activate a panel from a sleep mode. The activation process may include one or more of: providing power to the panel, receiving reference signals, determining channel estimates, selecting beams, determining transmission power levels, and/or transmitting reference signals. The panel status change 655 may include a deactivation process. The deactivation process may include placing an indicated panel in a sleep mode. When a panel is deactivated, the panel may not be used for transmission or reception.

Figure 7:
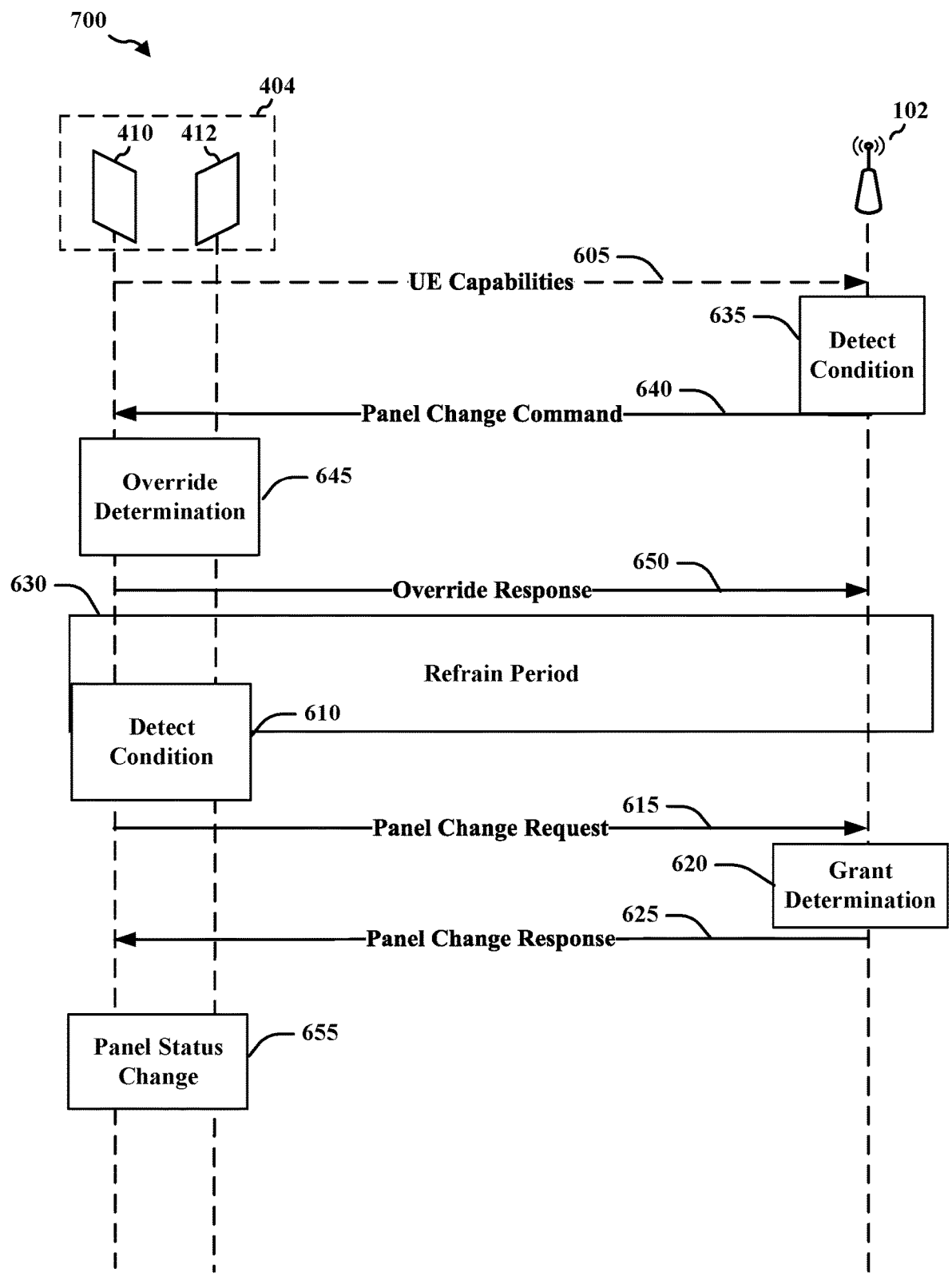
FIG. 7 is a message diagram showing an alternative order of example messages for activating and deactivating one or more panels of a multi-panel UE.

Turning to FIG. 7, an example message diagram 700 includes signaling messages similar to those in FIG. 6 that may be used to activate and/or deactivate one or more panels of an example MPUE 404. The order of the signaling in message diagram 700 may be different. In particular, the base station 102 may perform the detect condition process 635 prior to the MPUE 404 performing the detect condition process 610. Accordingly, the base station 102 may initiate a panel change process. Further, the MPUE 404 and the base station 102 may implement the refrain period 630 in response to the override response 650. Accordingly, if the detect condition process 610 occurs during the refrain period 630, the MPUE 404 may wait until after the refrain period 630 to transmit the panel change request 615.

Figure 8:
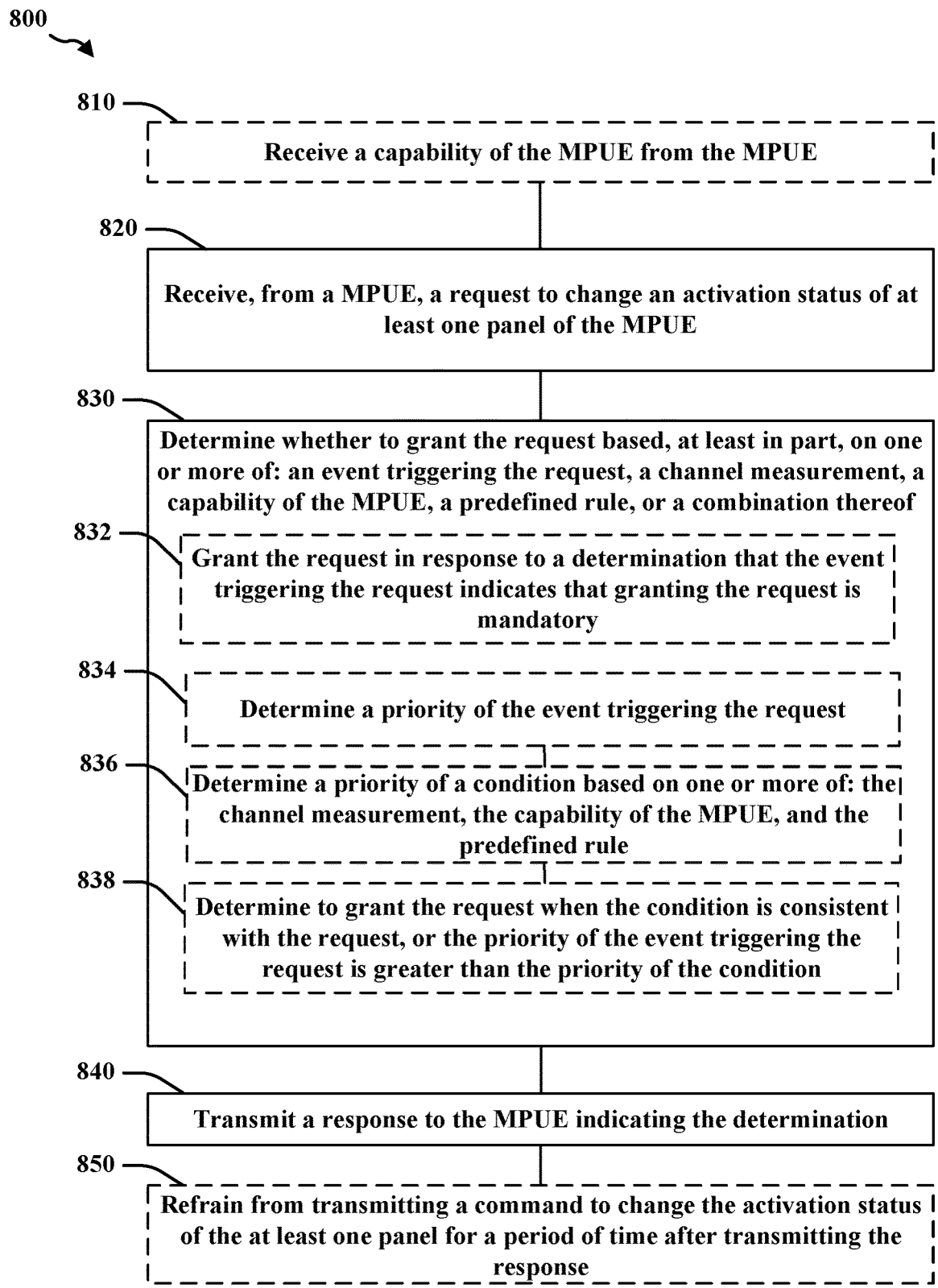
FIG. 8 is a flowchart of an example method of wireless communication for a base station to grant a change to a panel activation status.

FIG. 8 is a flowchart of an example method 800 of wireless communication. The method 800 may be performed by a base station (such as the base station 102, which may include the memory 376 and which may be the entire base station 102 or a component of the base station 102 such as the multi-panel component 198, TX processor 316, the RX processor 370, or the controller/processor 375). The method 800 may be performed in communication with an MPUE 404 including at least a first panel (e.g., panel 410) and a second panel (e.g., panel 412). Optional blocks are shown with dashed lines.

At block 810, the method 800 may optionally include receiving a capability of a MPUE from the MPUE. In an aspect, for example, the base station 102, the controller/processor 375, and/or the RX processor 370 may execute the multi-panel component 198 and/or the capability component 1348 to receive a capability of the MPUE 404 from the MPUE 404. The capability of the MPUE may be received as an information element of an RRC message. The capability of the MPUE may be a capability of at least one panel of the MPUE 404. Accordingly, the base station 102, the controller/processor 375, and/or the RX processor 370 executing the multi-panel component 198 and/or the capability component 1348 may provide means for receiving a capability of a MPUE from the MPUE.

At block 820, the method 800 may include receiving, from the MPUE, a request to change an activation status of at least one panel of the MPUE. In an aspect, for example, the base station 102, the controller/processor 375, and/or the RX processor 370 may execute the multi-panel component 198 and/or the request component 1342 to receive, at the base station 102, the panel change request 615 from the MPUE 404 to change an activation status of at least one panel of the MPUE 404. In an implementation, the panel change request 615 may include an indication of a condition triggering the panel change request, or a priority of the panel change request 615. Accordingly, the base station 102, the controller/processor 375, and/or the RX processor 370 executing the multi-panel component 198 and/or the request component 1342 may provide means for receiving, from a MPUE, a request to change an activation status of at least one panel of the MPUE.

At block 830, the method 800 may include determining whether to grant the request based, at least in part, on one or more of: an event triggering the request, a channel measurement, a capability of the UE, a predefined rule, or some combination thereof. In an aspect, for example, the base station 102, the controller/processor 375, and/or the RX processor 370 may execute the multi-panel component 198 and/or the evaluation component 1346 to determine whether to grant the panel change request 615 based, at least in part, on one or more of: the event triggering the request, the channel measurement, the capability of the UE, the predefined rule, or some combination thereof. For example, at sub-block 832, the evaluation component 1346 may determine to grant the panel change request 615 in response to a determination that the event triggering the panel change request 615 indicates that granting the panel change request 615 is mandatory. For example, the event triggering the status change condition may be satisfaction of a mandatory condition as defined by a standard or regulation. As another example, at sub-block 834, the evaluation component 1346 may determine a priority of the event triggering the panel change request 615. For instance, the priority may be included in the panel change request 615 or determined based on the event. At sub-block 836, the evaluation component 1346 may determine a priority of a condition based on one or more of: the channel measurement, the capability of the MPUE, and the predefined rule. For instance, the evaluation component 1346 may perform the detect condition process 635. At sub-block 838, the evaluation component 1346 may determine to grant the request when the condition is consistent with the request, or the priority of the event triggering the request is greater than the priority of the condition. Accordingly, the base station 102, the controller/processor 375, and/or the RX processor 370 executing the multi-panel component 198 and/or the evaluation component 1346 may provide means for determining whether to grant the request based, at least in part, on one or more of: an event triggering the request, a channel measurement, a capability of the MPUE, a predefined rule, or some combination thereof.

At block 840, the method 800 may include transmitting a response to the MPUE indicating the determination. In an aspect, for example, base station 102, the controller/processor 375, and/or the TX processor 316 may execute the multi-panel component 198 and/or the response component 1344 to transmit the panel change response 625 to the MPUE 404 indicating the determination. Accordingly, the base station 102, the controller/processor 375, and/or the TX processor 316 executing the multi-panel component 198 and/or the response component 1344 may provide means for transmitting a response to the MPUE indicating the determination.

At block 850, the method 800 may optionally include refraining from transmitting a command to change the activation status of the at least one panel for a period of time after transmitting the response. In an aspect, for example, the base station 102, the controller/processor 375, and/or the TX processor 316 may execute the multi-panel component 198 and/or the request component 1342 to refrain from transmitting a command to change the activation status of the at least one panel for a period of time after transmitting the panel change response 625. The period of time may be measured from a receipt of the panel change response 625 by the MPUE 404. For example, in response to receiving an acknowledgment from the MPUE of a packet carrying the panel change response 625. Accordingly, the base station 102, the controller/processor 375, and/or the TX processor 316 executing the multi-panel component 198 and/or the request component 1342 may provide means for refraining from transmitting a command to change the activation status of the at least one panel for a period of time after transmitting the response.

Figure 9:
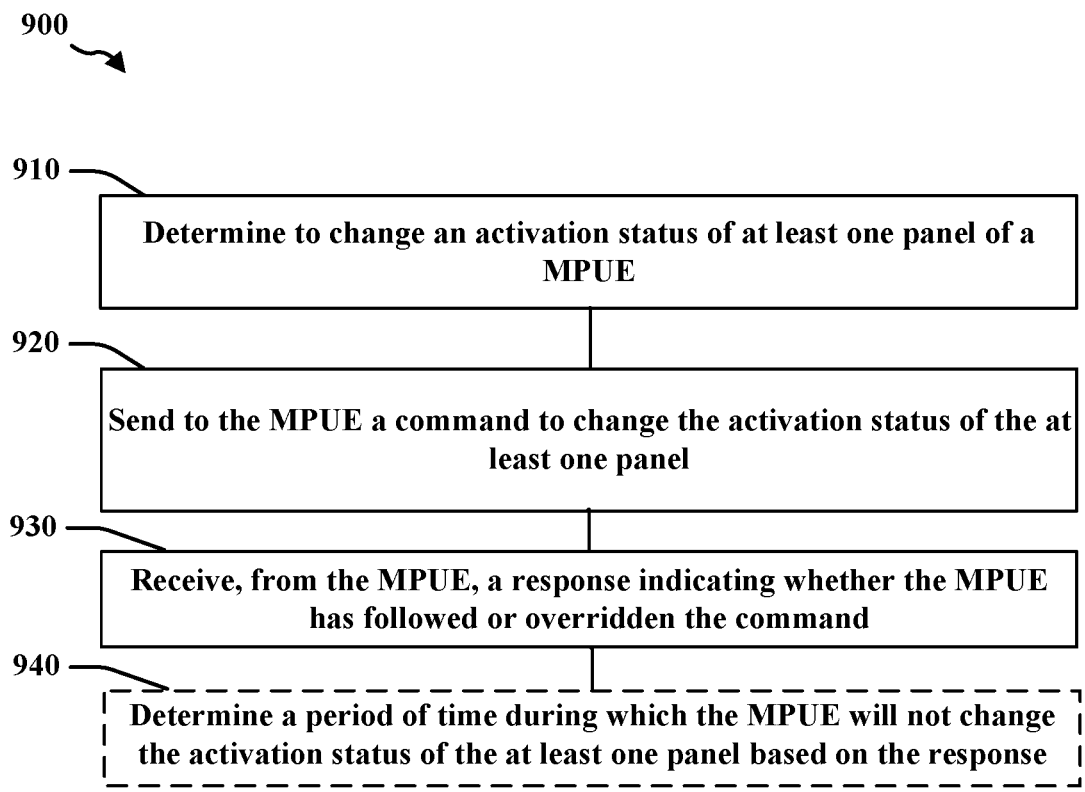
FIG. 9 is a flowchart of an example method of wireless communication for a base station to initiate a request to change a panel activation status FIG. 10 flowchart of an example method of wireless communication for a UE to initiate a request to change a panel activation status.

FIG. 9 is a flowchart of an example method 900 of wireless communication. The method 900 may be performed by a base station (such as the base station 102, which may include the memory 376 and which may be the entire base station 102 or a component of the base station 102 such as the multi-panel component 198, TX processor 316, the RX processor 370, or the controller/processor 375). The method 900 may be performed in communication with an MPUE 404 including at least a first panel (e.g., panel 410) and a second panel (e.g., panel 412). In an aspect, the method 900 may be performed in combination with the method 800. For example, the method 900 may be performed before or after the method 800. Optional blocks are shown with dashed lines.

At block 910, the method 900 may include determining to change an activation status of at least one panel of a MPUE. In an aspect, for example, the base station 102, the controller/processor 375, and/or the RX processor 370 may execute the multi-panel component 198 and/or the evaluation component 1346 to determine to change the activation status of at least one panel (e.g., panel 410) of the MPUE 404. For example, the evaluation component 1346 may perform the detect condition process 635. In an implementation, determining to change the activation status of the at least one panel is based on a condition detected based, at least in part, on: a UE report, a channel measurement, a predefined rule, a capability of the MPUE 404, or some combination thereof. Accordingly, the base station 102, the controller/processor 375, and/or the RX processor 370 executing the multi-panel component 198 and/or the evaluation component 1346 may provide means for determining to change an activation status of at least one panel of a MPUE.

At block 920, the method 900 may include sending, to the MPUE, a command to change the activation status of the at least one panel. In an aspect, for example, the base station 102, the controller/processor 375, and/or the TX processor 316 may execute the multi-panel component 198 and/or the request component 1342 to send, to the MPUE 404, the panel change command 640 to change the activation status of the at least one panel 410. In an implementation, the request to change the activation status may indicate the detected condition. Accordingly, the base station 102, the controller/processor 375, and/or the TX processor 316 executing the multi-panel component 198 and/or the request component 1342 may provide means for sending, to the UE, a command to change the activation status of the at least one panel.

At block 930, the method 900 may include receiving, from the MPUE, a response indicating whether the MPUE has followed or overridden the command. In an aspect, for example, the base station 102, the controller/processor 375, and/or the RX processor 370 may execute the multi-panel component 198 and/or the response component 1344 to receive, from the MPUE 404, the override response 650 indicating whether the MPUE 404 as followed or overridden the panel change command 640. In an implementation, when the condition is a mandatory condition, the override response 650 may indicate that the MPUE 404 has followed the panel change command 640. Accordingly, the base station 102, the controller/processor 375, and/or the RX processor 370 executing the multi-panel component 198 and/or the response component 1344 may provide means for receiving, from the UE, a response indicating whether the UE has followed or overridden the command.

At block 940, the method 900 may optionally include determining a period of time during which the UE will not change the activation status of the at least one panel based on the response. In an aspect, for example, the base station 102, the controller/processor 375, and/or the RX processor 370 may execute the multi-panel component 198 to determine the period of time (e.g., refrain period 630) during which the MPUE 404 will not change the activation status of the at least one panel based on the override response 650. For example, the length of the refrain period 630 may depend on whether the panel change command 640 was overridden. For instance, the refrain period 630 may be longer when the panel change command 640 is overridden in order to discourage frequent overrides. Accordingly, the base station 102, the controller/processor 375, and/or the RX processor 370 executing the multi-panel component 198 may provide means for determining a period of time during which the MPUE will not change the activation status of the at least one panel based on the response.

Figure 10:
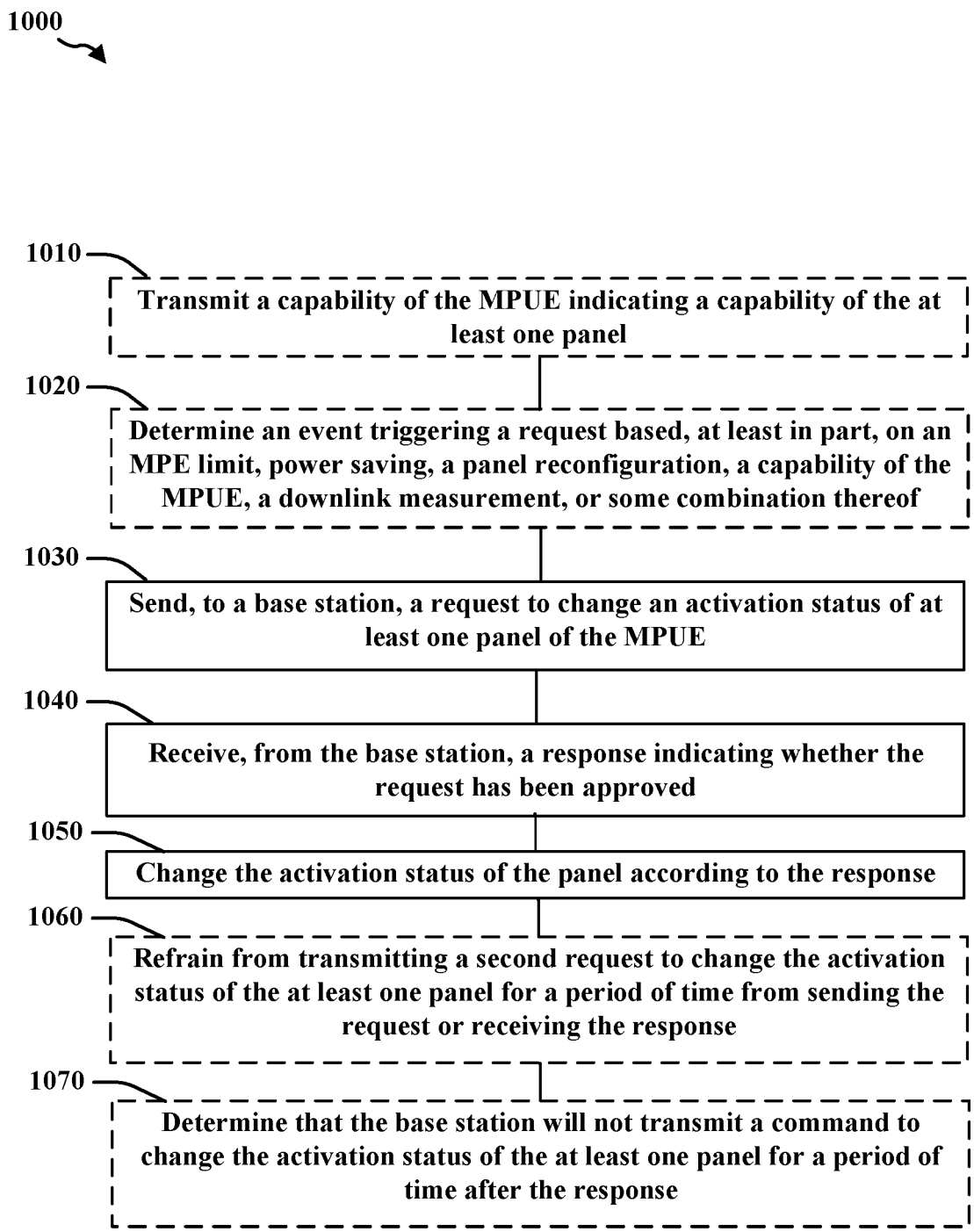

FIG. 10 is a flowchart of an example method 1000 of wireless communication. The method 1000 may be performed by a UE (e.g., the UE 104, which may include the memory 360 and which may be the entire UE 104 or a component of the UE 104 such as the panel control component 140, the TX processor 368, the RX processor 356, or the controller/processor 359, or the MPUE 404, 504, which may also include a panel control component 140). The UE performing the method 1000 may include at least a first panel (e.g., panel 410) and a second panel (e.g., panel 412). Optional blocks are shown with dashed lines At block 1010, the method 1000 may optionally include transmitting a capability of the MPUE 404 indicating a capability of the at least one panel. In an aspect, for example, the UE 104, the MPUE 404, 504, the TX processor 368 and/or the controller/processor 359 may execute the panel control component 140 and/or the capability component 149 to transmit a UE capability 605 indicating a capability of the at least one panel (e.g., panel 410). Accordingly, the UE 104, the MPUE 404, 504, the TX processor 368, and/or the controller/processor 359 executing the panel control component 140 and/or the capability component 149 may provide means for transmitting a capability of the MPUE indicating a capability of the at least one panel.

At block 1020, the method 1000 may optionally include determining an event triggering a request based, at least in part, on: an MPE limit, power saving, a panel reconfiguration, a capability of the MPUE, a downlink measurement, or a combination thereof. In an aspect, for example, the UE 104, the MPUE 404, 504, the TX processor 368 and/or the controller/processor 359 may execute the panel control component 140 and/or the request component 142 to determine an event triggering a request based, at least in part, on one or more of: the MPE limit, the power saving, the panel reconfiguration, the UE capability, or the downlink measurement. Accordingly, the UE 104, the MPUE 404, 504, the TX processor 368, and/or the controller/processor 359 executing the panel control component 140 and/or the request component 142 may provide means for determining an event triggering a request based, at least in part, on: an MPE limit, power saving, a panel reconfiguration, a capability of the MPUE, a downlink measurement, or some combination thereof.

At block 1030, the method 1000 may include sending, to a base station, a request to change an activation status of at least one panel of the MPUE. In an aspect, for example, the UE 104, the MPUE 404, 504, the TX processor 368 and/or the controller/processor 359 may execute the panel control component 140 and/or the request component 142 to send, to the base station 102, the panel change request 615 to change an activation status of at least one panel of the MPUE 404. In an implementation, the panel change request 615 includes an indication of the event triggering the request. Accordingly, the UE 104, the MPUE 404, 504, the TX processor 368, and/or the controller/processor 359 executing the panel control component 140 and/or the request component 142 may provide means for sending, to a base station, a request to change an activation status of at least one panel of the MPUE.

At block 1040, the method 1000 may include receiving, from the base station, a response indicating whether the request has been approved. An event triggering the request may be associated with a priority, and the UE may expect the request to be approved when the priority satisfies a threshold. In an aspect, for example, UE 104, the MPUE 404, 504, the RX processor 356 and/or the controller/processor 359 may execute the panel control component 140 and/or the response component 144 to receive, from the base station 102, the panel change response 625 indicating whether the request has been approved. The event triggering the panel change request 615 may be associated with a priority. The MPUE 404 may expect the panel change request 615 to be approved when the priority satisfies a threshold (e.g., is a mandatory event). Accordingly, the UE 104, the MPUE 404, 504, the RX processor 356, and/or the controller/processor 359 executing the panel control component 140 and/or the response component 144 may provide means for receiving, from the base station, a response indicating whether the request has been approved.

At block 1050, the method 1000 may include changing the activation status of the panel according to the response. In an aspect, for example, the UE 104, the MPUE 404, 504, the TX processor 368 and/or the controller/processor 359 may execute the panel control component 140 and/or the activation-deactivation component 148 to change the activation status of the panel according to the panel change response 625. Accordingly, the UE 104, the MPUE 404, 504, the TX processor 368, and/or the controller/processor 359 executing the panel control component 140 and/or the activation-deactivation component 148 may provide means for changing the activation status of the panel according to the response.

At block 1060, the method 1000 may optionally include refraining from transmitting a second request to change the activation status of the at least one panel for a period of time from sending the request or receiving the response. In an aspect, for example, the UE 104, the MPUE 404, 504, the TX processor 368 and/or the controller/processor 359 may execute the panel control component 140 and/or the request component 142 to refrain from transmitting a second request to change the activation status of the at least one panel for a period of time from sending the panel change request 615 or receiving the panel change response 625. Accordingly, the UE 104, the MPUE 404, 504, the TX processor 368, and/or the controller/processor 359 executing the panel control component 140 and/or the request component 142 may provide means for refraining from transmitting a second request to change the activation status of the at least one panel for a period of time from sending the request or receiving the response.

At block 1070, the method 1000 may optionally include determining that the base station will not transmit a command to change the activation status of the at least one panel for a period of time after the response. In an aspect, for example, the UE 104, the MPUE 404, 504, the TX processor 368 and/or the controller/processor 359 may execute the panel control component 140 and/or the response component 144 to determine that the base station 102 will not transmit a command to change the activation status of the at least one panel for a period of time after the panel change response 625. Accordingly, the UE 104, the MPUE 404, 504, the TX processor 368, and/or the controller/processor 359 executing the panel control component 140 and/or the response component 144 may provide means for determining that the base station will not transmit a command to change the activation status of the at least one panel for a period of time after the response.

Figure 11:
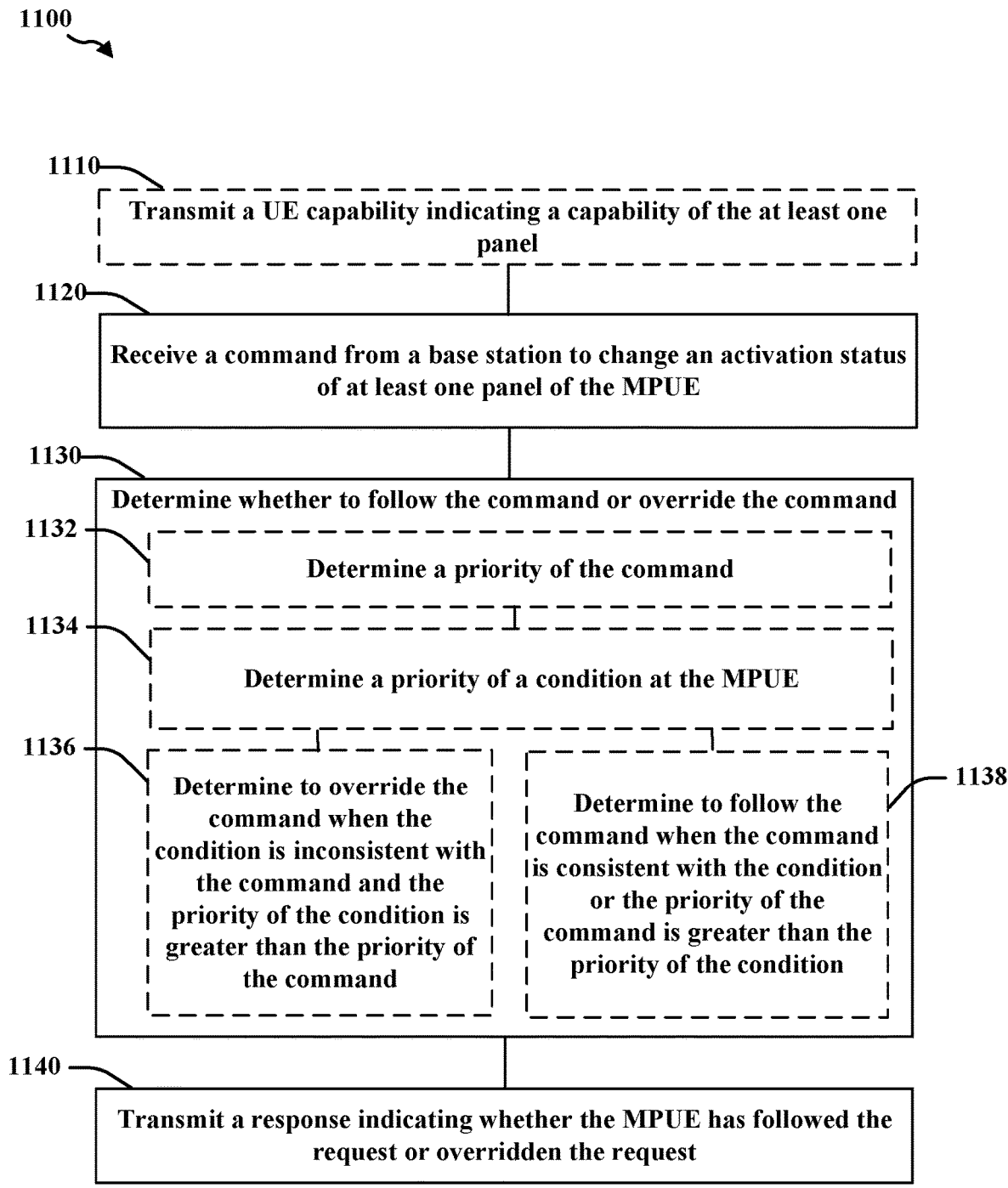
FIG. 11 flowchart of an example method of wireless communication for a UE to respond to a request to change a panel activation status.

FIG. 11 is a flowchart of an example method 1100 of wireless communication. The method 1100 may be performed by a UE (e.g., the UE 104, which may include the memory 360 and which may be the entire UE 104 or a component of the UE 104 such as the panel control component 140, the TX processor 368, the RX processor 356, or the controller/processor 359, or the MPUE 404, 504, which may also include a panel control component 140). The UE performing the method 1100 may include at least a first panel (e.g., panel 410) and a second panel (e.g., panel 412). In an aspect, the method 1100 may be performed in combination with the method 1000. For example, the method 1100 may be performed before or after the method 1000. Optional blocks are shown in dashed lines.

At block 1110, the method 1100 may optionally include transmitting a capability of the MPUE indicating a capability of the at least one panel. In an aspect, for example, the UE 104, the MPUE 404, 504, the TX processor 368 and/or the controller/processor 359 may execute the panel control component 140 and/or the capability component 149 to transmit the UE capability 605 indicating a capability of the at least one panel. Accordingly, the UE 104, the MPUE 404, 504, the TX processor 368, and/or the controller/processor 359 executing the panel control component 140 and/or the response component 144 may provide means for transmitting a capability of the MPUE indicating a capability of the at least one panel.

At block 1120, the method 1100 may include receiving a command from a base station to change an activation status of at least one panel of the MPUE. In an aspect, for example, the UE 104, the MPUE 404, 504, the RX processor 356 and/or the controller/processor 359 may execute the panel control component 140 and/or the request component 142 to receive, the panel change command 640 from the base station 102 to change the activation status of at least one panel (e.g., panel 410) of the MPUE 404. Accordingly, the UE 104, the MPUE 404, 504, the RX processor 356, and/or the controller/processor 359 executing the panel control component 140 and/or the response component 144 may provide means for receiving, at a UE including at least a first panel and a second panel, a command from a base station to change an activation status of at least one panel of the MPUE.

At block 1130, the method 1100 may include determining whether to follow the command or override the command. In an aspect, for example, the UE 104, the MPUE 404, 504, the TX processor 368 and/or the controller/processor 359 may execute the panel control component 140 and/or the override component 146 to determine whether to follow the request or override the request. In an implementation, at sub-block 1132, the block 1130 may optionally include determining a priority of the command. For example, the request component 142 may determine the priority of the panel change command 640. For instance, the panel change command 640 may include the priority, may indicate a condition that is associated with the priority, or both. At sub-block 1134, the block 1130 may optionally include determining a priority of a condition at the MPUE. For instance, the override component 146 may determine the condition at the MPUE based, at least in part, on: a maximum permissible exposure, a power saving, a panel reconfiguration, a capability of the MPUE, a downlink measurement, or some combination thereof. At sub-block 1136, the block 1130 may optionally include determining to override the command when the condition is inconsistent with the command and the priority of the condition is greater than the priority of the command. For example, the override component 146 may determine to override the panel change command 640 when the condition is inconsistent with the panel change command 640 and the priority of the condition is greater than the priority of the panel change command 640. At sub-block 1138, the block 1130 may optionally include determining to follow the command when the command is consistent with the condition or the priority of the command is greater than the priority of the condition. For example, the override component 146 may determine to follow the panel change command 640 when the panel change command 640 is consistent with the condition or the priority of the panel change command 640 is greater than the priority of the condition. Accordingly, the UE 104, the MPUE 404, 504, the TX processor 368, and/or the controller/processor 359 executing the panel control component 140 and/or the response component 144 may provide means for determining whether to follow the command or override the command.

At block 1140, the method 1100 may include transmitting a response indicating whether the MPUE has followed the request or overridden the request. In an aspect, for example, the UE 104, the MPUE 404, 504, the TX processor 368 and/or the controller/processor 359 may execute the panel control component 140 and/or the response component 144 to transmit the override response 650 indicating whether the MPUE 404 has followed the panel change command 640 or overridden the panel change command 640. Accordingly, the UE 104, the MPUE 404, 504, the TX processor 368, and/or the controller/processor 359 executing the panel control component 140 and/or the response component 144 may provide means for transmitting a response indicating whether the MPUE has followed the request or overridden the request.

Figure 12:
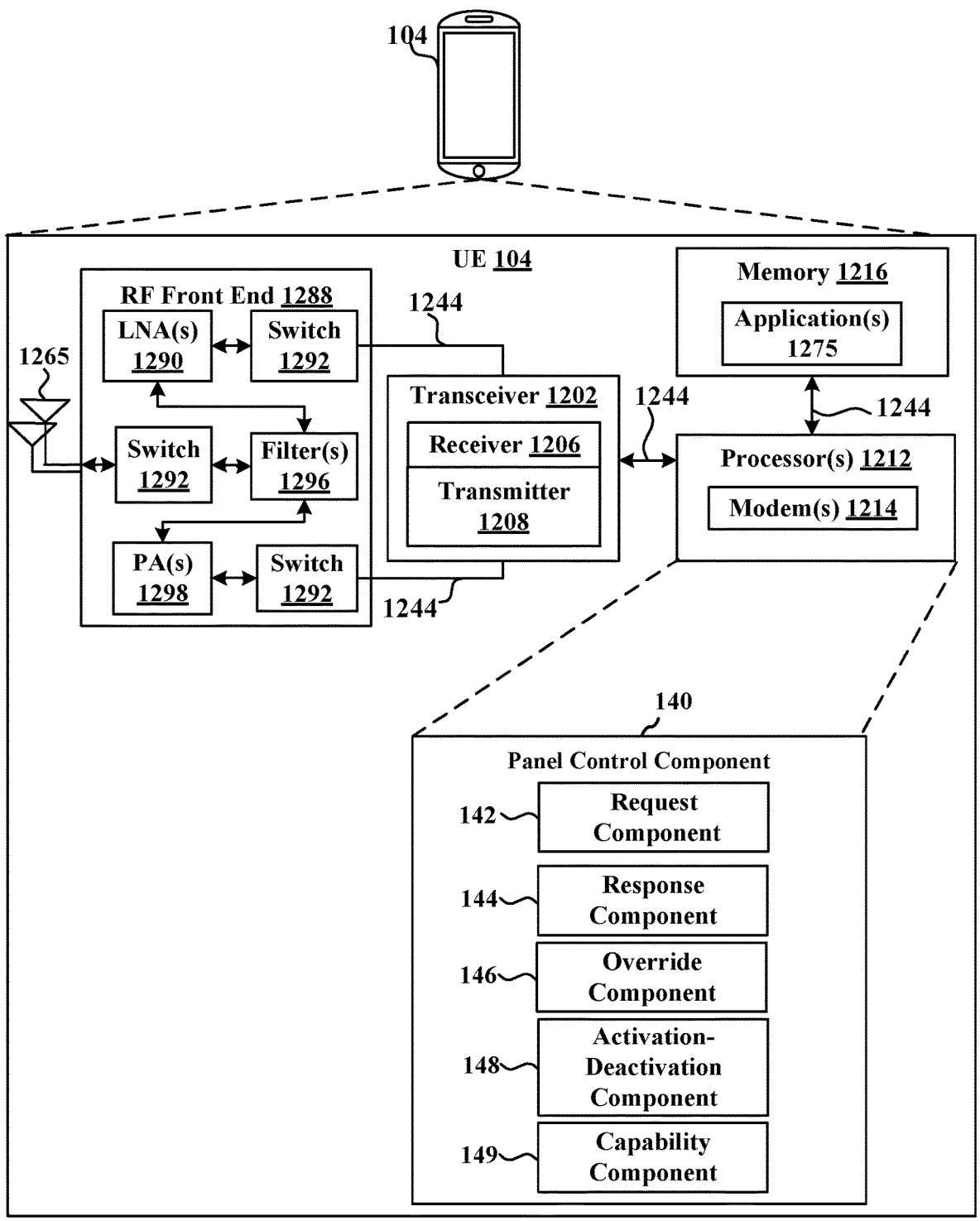
FIG. 12 is a schematic diagram of example components of the UE of FIG. 1.

Referring to FIG. 12, one example of an implementation of UE 104 may include a variety of components, some of which have already been described above, but including components such as one or more processors 1212 and memory 1216 and transceiver 1202 in communication via one or more buses 1244, which may operate in conjunction with modem 1214 and panel control component 140 to enable one or more of the functions described herein related to signaling for panel activation. Further, the one or more processors 1212, modem 1214, memory 1216, transceiver 1202, RF front end 1288 and one or more antennas 1265, may be configured to support voice and/or data calls (simultaneously or non-simultaneously) in one or more radio access technologies. The antennas 1265 may include one or more antennas, antenna elements, and/or antenna arrays.

In an aspect, the one or more processors 1212 can include a modem 1214 that uses one or more modem processors. The various functions related to panel control component 140 may be included in modem 1214 and/or processors 1212 and, in an aspect, can be executed by a single processor, while in other aspects, different ones of the functions may be executed by a combination of two or more different processors. For example, in an aspect, the one or more processors 1212 may include any one or any combination of a modem processor, or a baseband processor, or a digital signal processor, or a transmit processor, or a receiver processor, or a transceiver processor associated with transceiver 1202. In other aspects, some of the features of the one or more processors 1212 and/or modem 1214 associated with panel control component 140 may be performed by transceiver 1202.

Also, memory 1216 may be configured to store data used herein and/or local versions of applications 1275 or panel control component 140 and/or one or more of the subcomponents thereof being executed by at least one processor 1212. Memory 1216 can include any type of computer-readable medium usable by a computer or at least one processor 1212, such as random access memory (RAM), read only memory (ROM), tapes, magnetic discs, optical discs, volatile memory, non-volatile memory, and any combination thereof. In an aspect, for example, memory 1216 may be a non-transitory computer-readable storage medium that stores one or more computer-executable codes defining panel control component 140 and/or one or more of the subcomponents thereof, and/or data associated therewith, when UE 104 is operating at least one processor 1212 to execute panel control component 140 and/or one or more of the subcomponents thereof.

Transceiver 1202 may include at least one receiver 1206 and at least one transmitter 1208. Receiver 1206 may include hardware, firmware, and/or software code executable by a processor for receiving data, the code comprising instructions and being stored in a memory (e.g., computer-readable medium). Receiver 1206 may be, for example, a radio frequency (RF) receiver. In an aspect, receiver 1206 may receive signals transmitted by at least one base station 102. Additionally, receiver 1206 may process such received signals, and also may obtain measurements of the signals, such as, but not limited to, Ec/Io, SNR, RSRP, RSSI, etc. Transmitter 1208 may include hardware, firmware, and/or software code executable by a processor for transmitting data, the code comprising instructions and being stored in a memory (e.g., computer-readable medium). A suitable example of transmitter 1208 may including, but is not limited to, an RF transmitter.

Moreover, in an aspect, UE 104 may include RF front end 1288, which may operate in communication with one or more antennas 1265 and transceiver 1202 for receiving and transmitting radio transmissions, for example, wireless communications transmitted by at least one base station 102 or wireless transmissions transmitted by UE 104. RF front end 1288 may be connected to one or more antennas 1265 and can include one or more low-noise amplifiers (LNAs) 1290, one or more switches 1292, one or more power amplifiers (PAs) 1298, and one or more filters 1296 for transmitting and receiving RF signals.

In an aspect, LNA 1290 can amplify a received signal at a desired output level. In an aspect, each LNA 1290 may have a specified minimum and maximum gain values. In an aspect, RF front end 1288 may use one or more switches 1292 to select a particular LNA 1290 and a corresponding specified gain value based on a desired gain value for a particular application.

Further, for example, one or more PA(s) 1298 may be used by RF front end 1288 to amplify a signal for an RF output at a desired output power level. In an aspect, each PA 1298 may have specified minimum and maximum gain values. In an aspect, RF front end 1288 may use one or more switches 1292 to select a particular PA 1298 and a corresponding specified gain value based on a desired gain value for a particular application.

Also, for example, one or more filters 1296 can be used by RF front end 1288 to filter a received signal to obtain an input RF signal. Similarly, in an aspect, for example, a respective filter 1296 can be used to filter an output from a respective PA 1298 to produce an output signal for transmission. In an aspect, each filter 1296 can be connected to a specific LNA 1290 and/or PA 1298. In an aspect, RF front end 1288 can use one or more switches 1292 to select a transmit or receive path using a specified filter 1296, LNA 1290, and/or PA 1298, based on a configuration as specified by transceiver 1202 and/or processor 1212.

As such, transceiver 1202 may be configured to transmit and receive wireless signals through one or more antennas 1265 via RF front end 1288. In an aspect, transceiver may be tuned to operate at specified frequencies such that UE 104 can communicate with, for example, one or more base stations 102 or one or more cells associated with one or more base stations 102. In an aspect, for example, modem 1214 can configure transceiver 1202 to operate at a specified frequency and power level based on the UE configuration of the UE 104 and the communication protocol used by modem 1214.

In an aspect, modem 1214 can be a multiband-multimode modem, which can process digital data and communicate with transceiver 1202 such that the digital data is sent and received using transceiver 1202. In an aspect, modem 1214 can be multiband and be configured to support multiple frequency bands for a specific communications protocol. In an aspect, modem 1214 can be multimode and be configured to support multiple operating networks and communications protocols. In an aspect, modem 1214 can control one or more components of UE 104 (e.g., RF front end 1288, transceiver 1202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

Referring to FIG. 13, one example of an implementation of base station 102 may include a variety of components, some of which have already been described above, but including components such as one or more processors 1312 and memory 1316 and transceiver 1302 in communication via one or more buses 1354, which may operate in conjunction with modem 1314 and multi-panel component 198 to enable one or more of the functions described herein related to signaling panel activation.

The transceiver 1302, receiver 1306, transmitter 1308, one or more processors 1312, memory 1316, applications 1375, buses 1354, RF front end 1388, LNAs 1390, switches 1392, filters 1396, PAs 1398, and one or more antennas 1365 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Some Further Example Embodiments

A first example method of wireless communication, comprising, at a base station: receiving, from a MPUE, a request to change an activation status of at least one panel of the MPUE; determining whether to grant the request based, at least in part, on an event triggering the request, a channel measurement, a capability of the UE, a predefined rule, or some combination thereof; and transmitting a response to the UE indicating the determination.

The above first example method, further comprising refraining from transmitting a command to change the activation status of the at least one panel for a period of time after transmitting the response.

The above first example method, wherein the period of time is measured from a receipt of the response by the MPUE.

Any of the above first example methods, wherein the request includes an indication of a condition triggering the request, a priority of the request, or both.

Any of the above first example methods, wherein determining whether to grant the request based, at least in part, on the event triggering the request further comprises granting the request in response to a determination that the event triggering the request indicates that granting the request is mandatory.

Any of the above first example methods, wherein determining whether to grant the request based, at least in part, on the event triggering the request further comprises: determining a priority of the event triggering the request; determining a priority of a condition based on: the channel measurement, the capability of the MPUE, the predefined rule, or a combination thereof; and determining to grant the request when the condition is consistent with the request, or the priority of the event triggering the request is greater than the priority of the condition.

Any of the above first example methods, further comprising receiving the capability of the MPUE from the MPUE.

Any of the above first example methods, wherein the capability of the MPUE is a capability of the at least one panel.

Any of the above first example methods, wherein the channel measurement includes a measurement of interference to a transmission of another UE.

Any of the above first example methods, wherein the channel measurement includes uplink channel state information for the MPUE.

Any of the above first example methods, wherein the predefined rule comprises a scheduling rule.

Any of the above first example methods, wherein the request to change the activation status of at least one panel includes a request to activate one or more deactivated panels, a request to deactivate one or more activated panels, or a request to activate at least one deactivated panel and deactivate at least one activated panel.

Any of the above first example methods, further comprising, at the base station: determining to change the activation status of the at least one panel of the MPUE; sending to the MPUE, a command to change an activation status of at least one panel of the MPUE; and receiving, from the MPUE, a response indicating whether the MPUE has followed or overridden the command.

A second example method of wireless communication, comprising, at a base station: determining to change an activation status of at least one panel of a MPUE; sending, to the UE, a command to change the activation status of the at least one panel; and receiving, from the MPUE, a response indicating whether the MPUE has followed or overridden the command.

The above second example method, wherein determining to change the activation status of the at least one panel is based on a condition detected based, at least in part, on: a UE report, a channel measurement, a predefined rule, a capability of the MPUE, or some combination thereof.

The above second example method, wherein the command to change the activation status indicates the condition.

Any of the above second example methods, wherein the command to change the activation status of the at least one panel includes a request to activate one or more deactivated panels, a request to deactivate one or more activated panels, or a request to activate at least one deactivated panel and deactivate at least one activated panel.

Any of the above second example methods, wherein the condition is a mandatory condition and the response indicates that the UE has followed the command.

Any of the above second example methods, wherein the response indicates that the MPUE has overridden the command, further comprising determining a period of time during which the MPUE will not change the activation status of the at least one panel based on the response.

Any of the above second example methods, further comprising: receiving a request from the MPUE to change the activation status of the at least one panel, the request including an indication of an event triggering the request; determining whether to grant the request based, at least in part, on: the event triggering the request, a channel measurement, a capability of the UE, a predefined rule, or a combination thereof; and transmitting a response to the MPUE indicating the determination.

An apparatus for wireless communication, comprising: a memory; and at least one processor coupled with the memory and configured to perform any of the above first or second example methods.

An apparatus for wireless communication, comprising: means for performing any of the above first or second example methods.

A non-transitory computer-readable medium storing computer executable code, the code when executed by a processor cause the processor to perform any of the above first or second example methods.

A third example method of wireless communication, comprising, at a MPUE: sending, to a base station, a request to change an activation status of at least one panel of the MPUE; receiving, from the base station, a response indicating whether the request has been approved; and changing the activation status of the panel according to the response.

The above third example method, further comprising determining an event triggering the request based, at least in part, on: an MPE limit, power saving, a panel reconfiguration, a capability of the UE, a downlink measurement, or some combination thereof.

Any of the above third example methods, wherein the request includes an indication of an event triggering the request.

Any of the above third example methods, wherein the event triggering the request is associated with a priority, and the MPUE expects the request to be approved when the priority satisfies a threshold.

Any of the above third example methods, further comprising transmitting a capability of the MPUE indicating a capability of the at least one panel.

Any of the above third example methods, further comprising determining that the base station will not transmit a command to change the activation status of the at least one panel for a period of time after the response.

Any of the above third example methods, wherein the period of time is measured from a receipt of the response by the MPUE.

Any of the above third example methods, further comprising refraining from transmitting a second request to change the activation status of the at least one panel for a period of time from sending the request or receiving the response.

Any of the above third example methods, further comprising, at the MPUE: receiving a command from the base station to change the activation status of the at least one panel of the MPUE; determining whether to follow the command or override the command; and transmitting a response indicating whether the MPUE has followed the command or overridden the command.

A fourth example method of wireless communication, comprising, at a MPUE: receiving, from a base station, a command to change an activation status of at least one panel of the MPUE; determining whether to follow the command or override the command; and transmitting, from the MPUE, a response indicating whether the MPUE has followed the command or overridden the command.

The above fourth example method, wherein determining, whether to follow the command or override the command comprises: determining a priority of the command; determining a priority of a condition at the MPUE; and determining to override the command when the condition is inconsistent with the command and the priority of the condition is greater than the priority of the command.

Any of the above fourth example methods, wherein the command comprises the priority of the command.

Any of the above fourth example methods, wherein determining the priority of the condition at the MPUE is based, at least in part, on: a maximum permissible exposure, a power saving, a panel reconfiguration, a capability of the MPUE, a downlink measurement, or a combination thereof.

Any of the above fourth example methods, further comprising determining to follow the command when the command is consistent with the condition or the priority of the command is greater than the priority of the condition.

Any of the above fourth example methods, further comprising, at the MPUE: sending, to the base station, a request to change the activation status of the at least one panel of the MPUE, the request including an indication of an event triggering the request; and receiving, from the base station, a response indicating whether the request has been approved.

An apparatus for wireless communication, comprising: a memory; and at least one processor coupled with the memory and configured to perform any of the above third or fourth example methods.

An apparatus for wireless communication, comprising means for performing any of the above third or fourth example methods.

A non-transitory computer-readable medium storing computer executable code, the code when executed by a processor cause the processor to perform any of the above third or fourth example methods.

What is claimed is:

1. A method of wireless communication, comprising, at a base station:
   receiving, from a multi-panel user equipment (MPUE), a request to change an activation status of at least one panel of the MPUE;
   determining whether to grant the request based, at least in part, on: an event triggering the request, a channel measurement, a capability of the MPUE, a predefined rule, or some combination thereof; and
   transmitting a response to the MPUE indicating the determination.

2. The method of claim 1, further comprising refraining from transmitting a command to the MPUE to change the activation status of the at least one panel for a period of time after transmitting the response.

3. The method of claim 2, wherein the period of time is measured from a receipt of the response by the MPUE.

4. The method of claim 1, wherein the request includes an indication of a condition triggering the request, a priority of the request, or both.

5. The method of claim 1, wherein determining whether to grant the request based, at least in part, on the event triggering the request further comprises:
   granting the request in response to a determination that the event triggering the request indicates that granting the request is mandatory.

6. The method of claim 1, wherein determining whether to grant the request comprises:
   determining a priority of the event triggering the request;
   determining a priority of a condition based on one or more of: the channel measurement, the capability of the MPUE, or the predefined rule; and
   determining to grant the request when the condition is consistent with the request, or the priority of the event triggering the request is greater than the priority of the condition.

7. The method of claim 1, further comprising receiving the capability of the MPUE from the MPUE.

8. The method of claim 1, wherein the capability of the MPUE comprises a capability of the at least one panel.

9. The method of claim 1, wherein the channel measurement includes a measurement of interference to a transmission of another UE.

10. The method of claim 1, wherein the channel measurement includes uplink channel state information for the MPUE.

11. The method of claim 1, wherein the predefined rule comprises a scheduling rule.

12. The method of claim 1, further comprising, at the base station:
    determining to change the activation status of the at least one panel of the MPUE;
    sending, to the MPUE, a command to change the activation status of the at least one panel of the MPUE; and
    receiving, from the MPUE, a response indicating whether the MPUE has followed or overridden the command.

13. The method of claim 1, wherein the request to change the activation status of at least one panel includes a request to activate one or more deactivated panels, a request to deactivate one or more activated panels, or a request to activate at least one deactivated panel and deactivate at least one activated panel.

14. An apparatus for wireless communication, comprising:
    a memory storing computer-executable instructions; and
    at least one processor coupled with the memory and configured to execute the instructions, at a base station, to:
    receive, from a multi-panel user equipment (MPUE), a request to change an activation status of at least one panel of the MPUE;
    determine whether to grant the request based on one or more of: an event triggering the request, a channel measurement, a capability of the MPUE, a predefined rule, or some combination thereof; and
    transmit a response to the MPUE indicating the determination.

15. The apparatus of claim 14, wherein the at least one processor is configured to:
    determine a priority of the event triggering the request;
    determine a priority of a condition based on one or more of: the channel measurement, the capability of the MPUE, or the predefined rule; and
    determine to grant the request when the condition is consistent with the request, or the priority of the event triggering the request is greater than the priority of the condition.

16. The apparatus of claim 14, wherein the channel measurement includes a measurement of interference to a transmission of another UE or uplink channel state information for the MPUE.

17. The apparatus of claim 14, wherein the at least one processor is configured to:
    determine to change the activation status of the at least one panel of the MPUE;
    send, to the MPUE, a command to change the activation status of the at least one panel of the MPUE; and
    receive, from the MPUE, a response indicating whether the MPUE has followed or overridden the command.

18. A method of wireless communication, comprising, at a multi-panel user equipment (MPUE):
    sending, to a base station, a request to change an activation status of at least one panel of the MPUE;
    receiving, from the base station, a response indicating whether the request has been approved; and changing the activation status of the at least one panel according to the response.

19. The method of claim 18, further comprising determining an event triggering the request based, at least in part, on: a maximum permissible exposure (MPE) limit, power saving, a panel reconfiguration, a capability of the MPUE, a downlink measurement, a predefined rule, or some combination thereof.

20. The method of claim 18, wherein the request includes an indication of an event triggering the request.

21. The method of claim 20, wherein the event triggering the request is associated with a priority, and the MPUE expects the request to be approved when the priority satisfies a threshold.

22. The method of claim 18, further comprising transmitting a capability of the MPUE indicating a capability of the at least one panel.

23. The method of claim 18, further comprising determining that the base station will not transmit a command to change the activation status of the at least one panel for a period of time after the response.

24. The method of claim 23, wherein the period of time is measured from a receipt of the response by the MPUE.

25. The method of claim 18, further comprising refraining from transmitting a second request to change the activation status of the at least one panel for a period of time from sending the request or receiving the response.

26. The method of claim 18, further comprising, at the MPUE:
 receiving a command from the base station to change the activation status of the at least one panel of the MPUE;
 determining whether to follow the command or override the command; and
 transmitting a response indicating whether the MPUE has followed the command or overridden the command.

27. An apparatus for wireless communication, comprising:
 a memory storing computer-executable instructions; and
 at least one processor coupled with the memory and configured to execute the instructions to: send, from a multi-panel user equipment (MPUE) to a base station, a request to change an activation status of at least one panel of the MPUE;
 receive, from the base station, a response indicating whether the request has been approved; and
 change the activation status of the at least one panel according to the response.

28. The apparatus of claim 27, wherein the at least one processor is configured to determine an event triggering the request based, at least in part, on: a maximum permissible exposure (MPE) limit, power saving, a panel reconfiguration, a capability of the MPUE, a downlink measurement, a predefined rule, or some combination thereof.

29. The apparatus of claim 27, wherein the at least one processor is configured to determine that the base station will not transmit a command to change the activation status of the at least one panel for a period of time after the response, wherein the period of time is measured from a receipt of the response by the MPUE.

30. The apparatus of claim 27, wherein the at least one processor is configured to:
 receive, a command from the base station to change the activation status of the at least one panel of the MPUE;
 determine whether to follow the command or override the command; and
 transmit a response indicating whether the MPUE has followed the command or overridden the command.

* * * * *